(12) United States Patent
Osman

(10) Patent No.: US 7,043,897 B2
(45) Date of Patent: May 16, 2006

(54) SQUARE ULTRA THRUST REVERSER SYSTEM

(76) Inventor: Medhat A. Osman, 2316 Cathy Ct., Gilbert, AZ (US) 85296

( * ) Notice: Subject to any disclaimer, the term of this patent is extended or adjusted under 35 U.S.C. 154(b) by 721 days.

(21) Appl. No.: 10/042,737

(22) Filed: Aug. 29, 2002

(65) Prior Publication Data

US 2005/0160718 A1   Jul. 28, 2005

(51) Int. Cl.
*F02K 3/02* (2006.01)
(52) U.S. Cl. ............... 60/226.2; 60/226.2; 239/265.37; 244/110 B
(58) Field of Classification Search ............... 60/226.2, 60/230; 239/265.19, 265.37; 244/110 B
See application file for complete search history.

(56) References Cited

U.S. PATENT DOCUMENTS 4,690,329 A  *  9/1987  Madden ................. 239/265.19
5,050,803 A  *  9/1991  Wakeman et al. ..... 239/265.35
5,775,097 A  *  7/1998  Lardy et al. ............... 60/226.2

* cited by examiner

*Primary Examiner*—Charles G. Freay
(74) *Attorney, Agent, or Firm*—Sue Z. Shaper

(57) ABSTRACT

A thrust reverser system for jet engine comprising a tailpipe, Square/trapezoidal clamshell doors and actuators, wherein the tailpipe and clamshell doors may be corrugated, the corrugations can be mating, the actuators may be situated out of the external free air flow, the doors may be stowed out of contact with internal engine gas flow and that may include a tail pipe a fairing having a movable section.

23 Claims, 14 Drawing Sheets

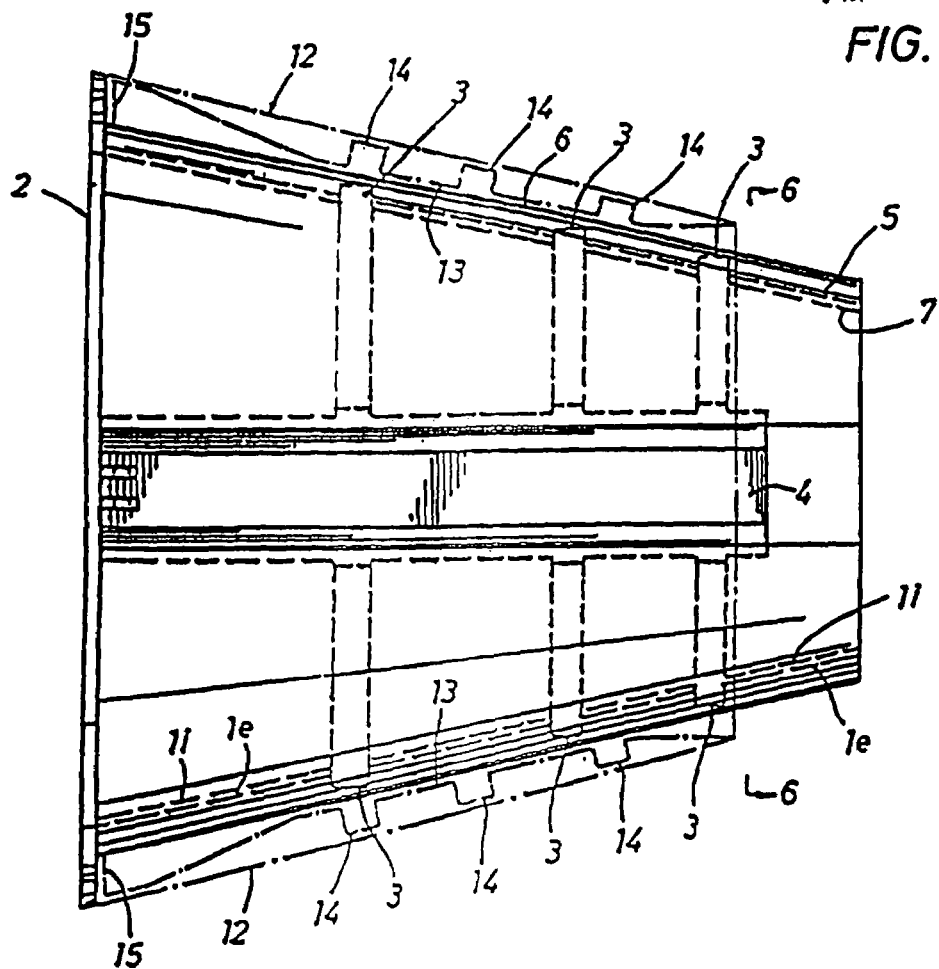
PRIOR ART
FIG. 3
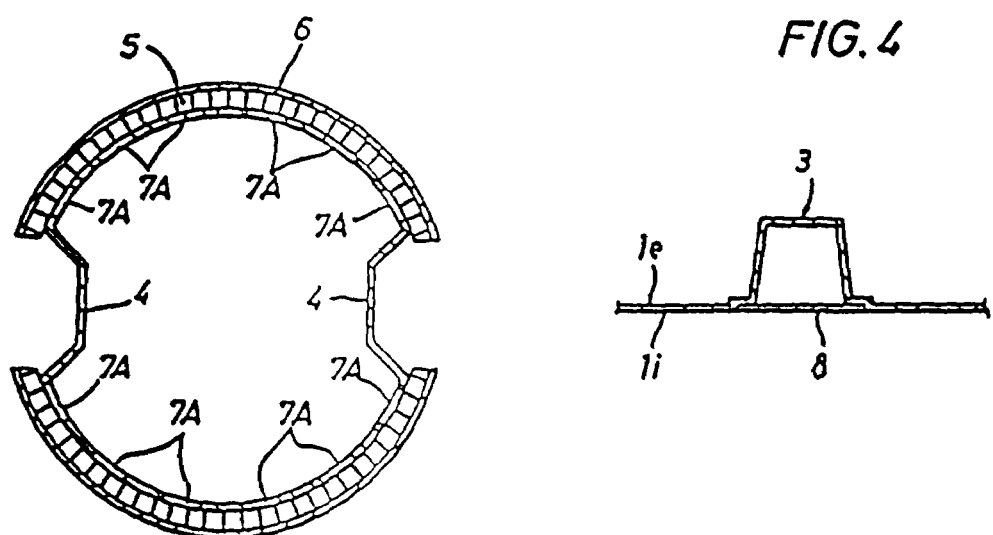
PRIOR ART
FIG. 4
PRIOR ART
FIG. 6

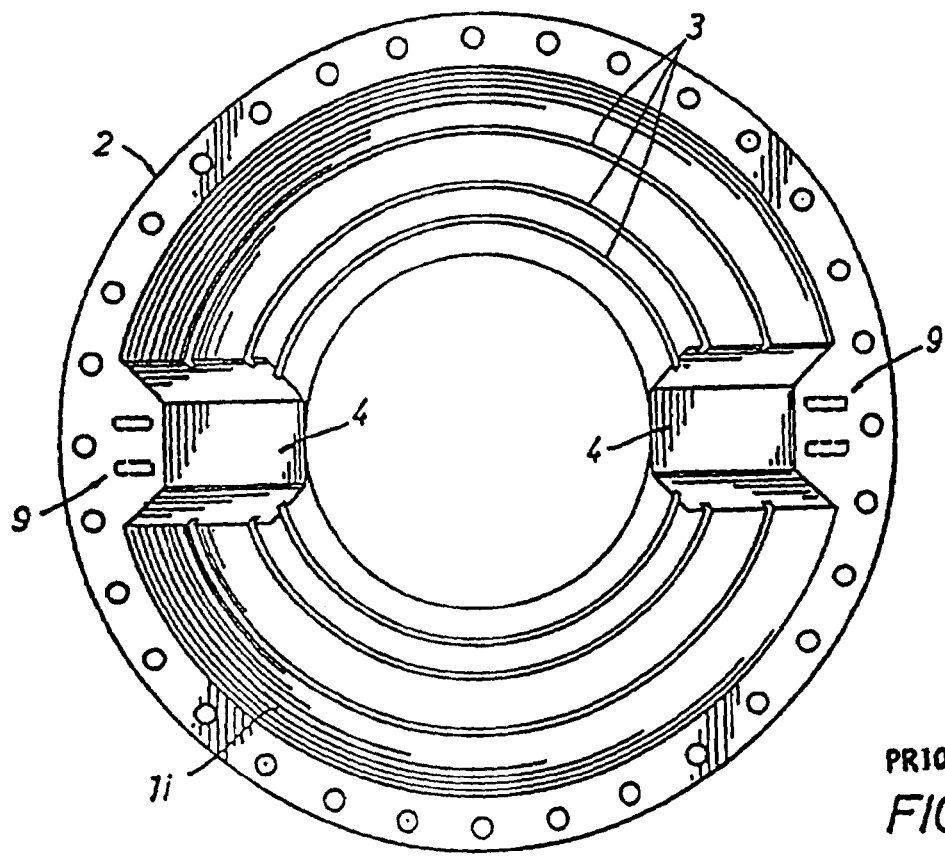
PRIOR ART
FIG. 9
PRIOR ART
FIG. 5
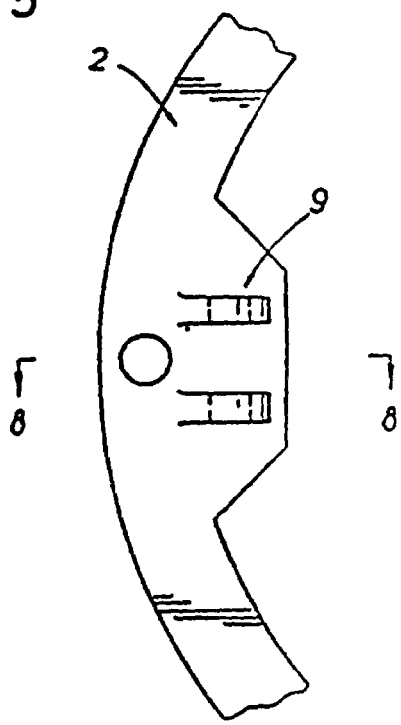
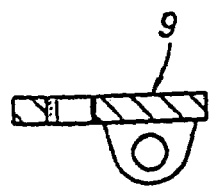
PRIOR ART
FIG. 8

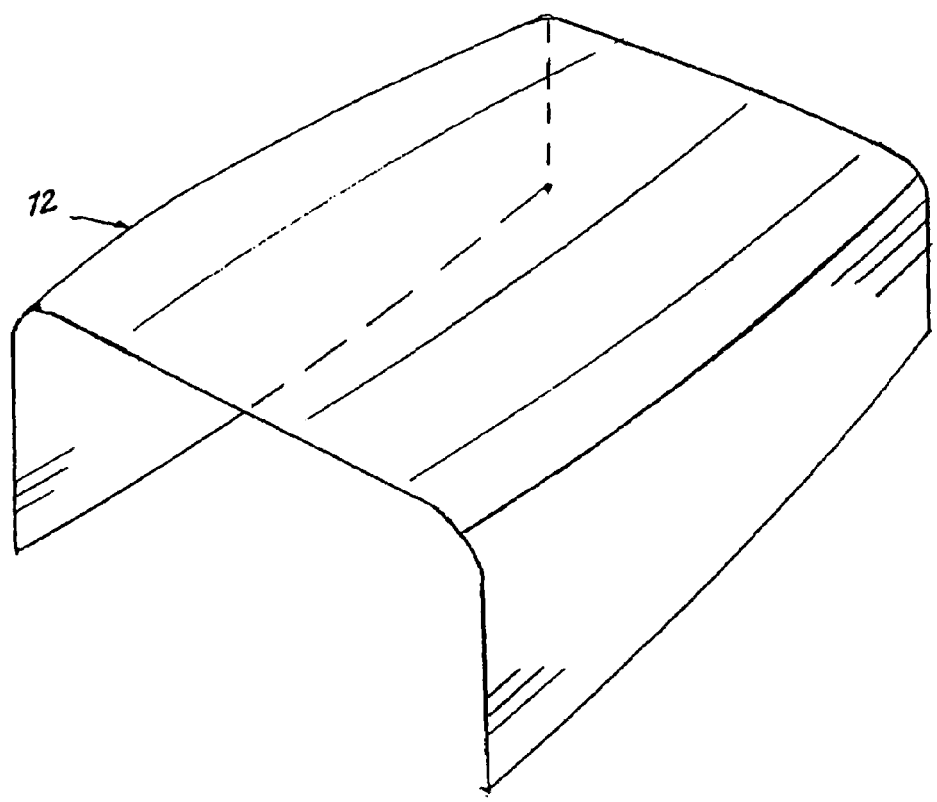
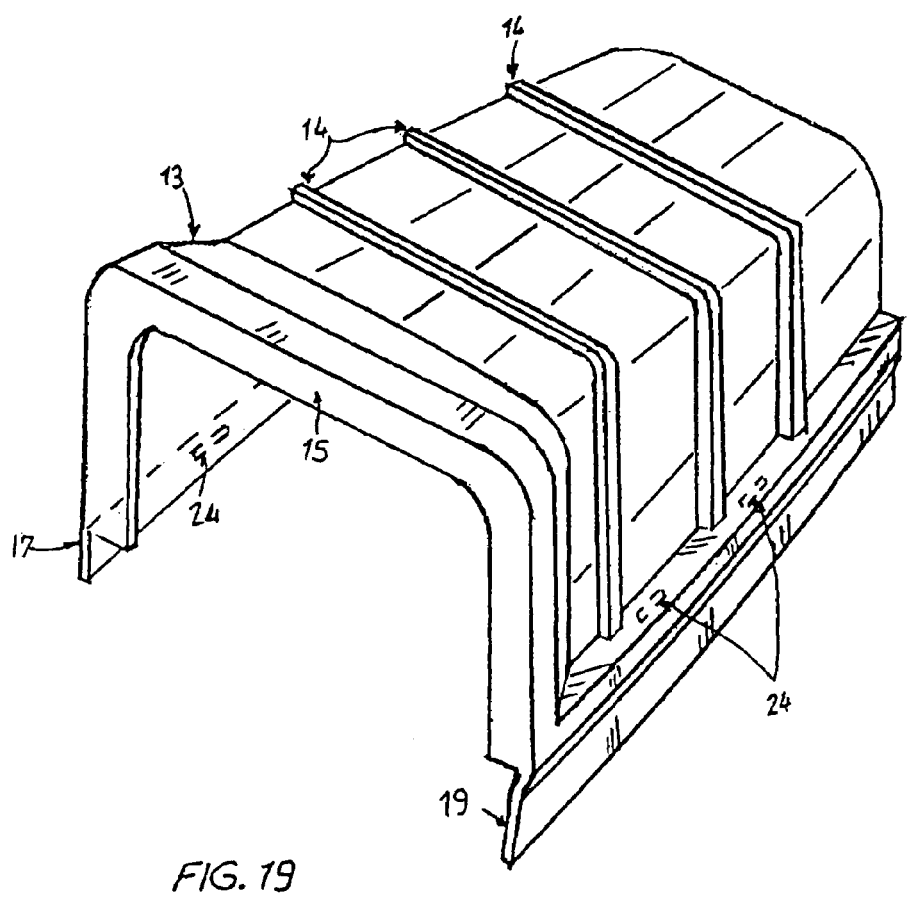
FIG. 19

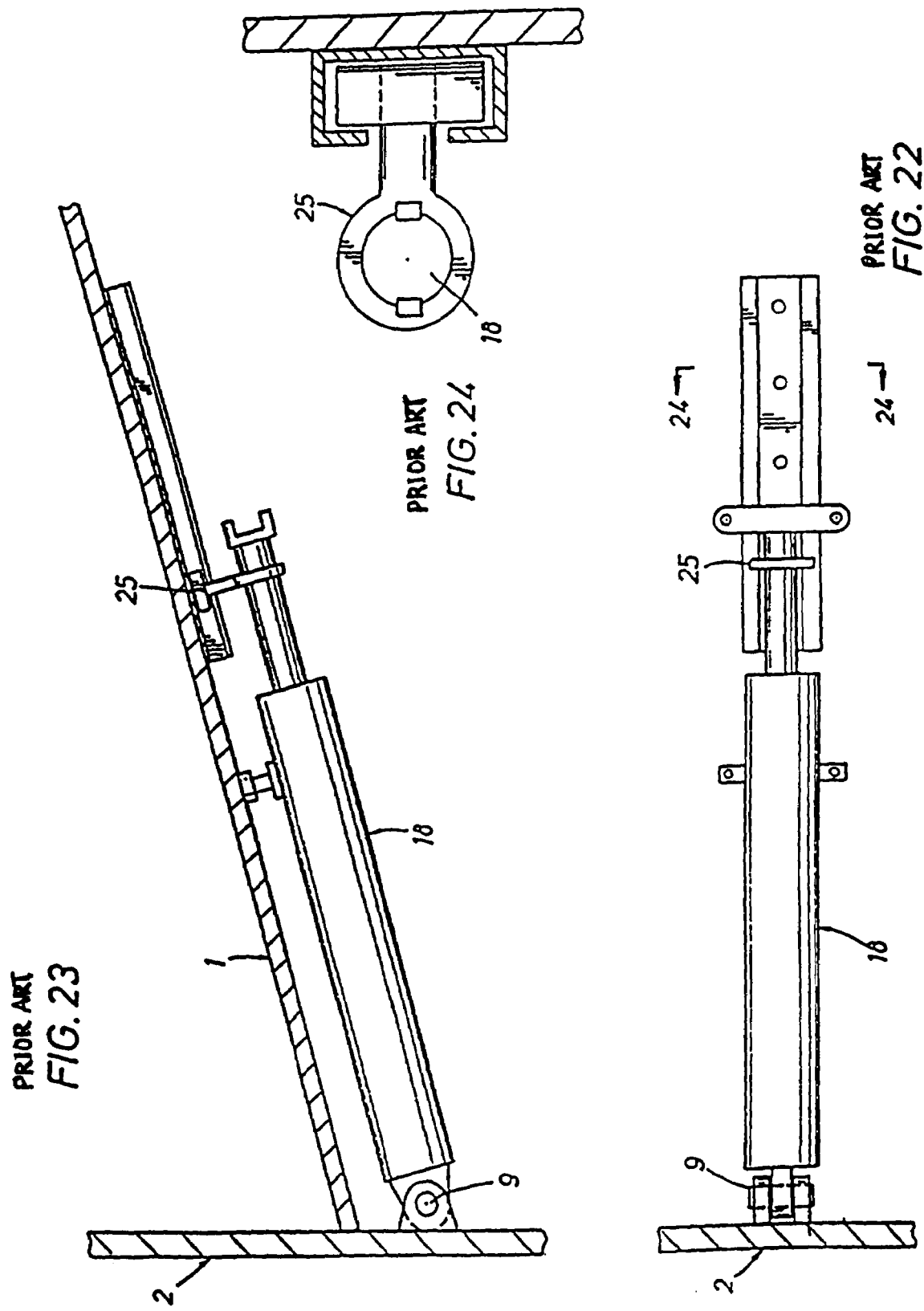

SQUARE ULTRA THRUST REVERSER SYSTEM

FIELD OF THE INVENTION

This invention relates to thrust reverser systems for aircraft jet engines, based on the ULTRA THRUST REVERSER SYSTEM U.S. Pat. No. 5,615,834. This patent relates to Applicant's Disclosure Document filed Mar. 27, 2000, application No. 60/192,337.

BACKGROUND OF THE INVENTION

Thrust reverser systems are used to decelerate a jet aircraft, and in particular to slow it down after landing, to slow it down during taxiing, and to aid it to back-up from a tight spot or a gate if needed. Reversing the exhaust jet flow from the engines provides the desired deceleration, especially on short runways, and slows down the aircraft to a safe taxiing speed thereby allowing the pilot to use the brakes on the taxiways.

Previous designs such as U.S. Pat. Nos. 2,968,150 and 3,610,534, sometimes referred to as four bar designs, the thrust reverser is built around the exhaust tailpipe. However, the protrusion of the actuation mechanism into the free air stream surrounding the reverser system, or engine nacelle, has the disadvantage of possibly incurring significant external drag which can penalize aircraft performance in various modes of operation and higher weight penalty.

U.S. Pat. No. 4,129,269, referred to in the industry as the single-pivot design, provides a light construction thrust reverser concept in which the movable doors and a reduced tailpipe form the exhaust system in forward thrust. The single-pivot design has the disadvantage of possibly permitting leakage of the internal engine gas flow between the stowed doors and the tailpipe. Exhaust flow leakage through the door/tailpipe system, do adversely impact engine thrust performance, fuel consumption and overall aircraft performance.

The ULTRA THRUST REVERSER SYSTEM is built on a continuous tailpipe to minimize external drag, while avoiding the drawbacks of leakage from the exhaust tailpipe. Exhaust plumes from both of the aforementioned conventional reverser designs are known to sometimes affect the aircraft control surface during reverse thrust operation. Both aforementioned designs therefore can require additional external surfaces to be attached to the aircraft pylon or other methods to divert the plume away from such control surfaces. Those additional external surfaces, mandated by considerations of compatibility and systems integration of the reverser with the aircraft, add further cost, weight, potential drag and vibration.

The new SQUARE ULTRA THRUST REVERSER SYSTEM design of the present invention optimizes primarily reverse thrust performance by redesigning the shape of the inner door surface to make it flat compared to the existing circular configurations, to maximize the efficiency of reverse flow in the forward direction and to reduce the likelihood of exhaust plume impingement on the aircraft surfaces. In the forward thrust mode, the SQUARE ULTRA is similar to the ULTRA THRUST REVERSER SYSTEM, in the fact that it comprises the design features which optimize forward thrust performance during the various modes of forward flight, and especially during the cruise mode where the aircraft spends most of its flight time. The new design preserves the prior design features in the same manner by combining lighter construction with the primary goal of optimizing internal and external flow aerodynamic characteristics. The rectangular trapezoidal door design deals effectively with aircraft/thrust reverser integration and compatibility issues, primarily the plume impingement on the aircraft control surfaces, discussed above, by using the sides of the rectangular doors as a buffer to prevent exhaust gases from escaping laterally and impinging on the aircraft surfaces, thereby providing an integrated means to control the plume and divert it away from the aircraft control surfaces. The reverse thrust efficiency is increased by using flat surfaces in the door design to deflect the majority of exhaust gases forward. The new design combines all the characteristics of the ULTRA THRUST REVERSER SYSTEM in addition to better reverse flow performance.

The housing design, in general, for the reverser system, including the actuators and the associated operating mechanism, can adversely affect the external air flow around the tailpipe causing external drag (due to the protrusion of reverser mechanisms in the free air stream around the nacelle thereby causing excessive drag during flight as in the case of the conventional four bar design. The housing design disclosed herein is based on the ULTRA REVERSER design, wherein it benefits from the fact that its housing not only affords no leakage path in the internal gas flow, but also that its housing does not protrude into the free air stream around the nacelle. Conventional single pivot reverser designs have the potential for significant flow leakage between such doors and the rest of the tailpipe. This defect is compounded by a further inability of that design to control the tailpipe exit area which adversely affects forward thrust. These two defects of this particular conventional housing design severely affect the engine's fuel consumption and performance, penalizing the aircraft's overall performance and range. On the other hand, excessive drag during flight incurred by the other conventional four bar housing design also penalizes the aircraft's overall performance and range. This drag is eliminated by using the housing design approach used on the ULTRA REVERSERSYSTEM.

Conventional construction techniques for target type thrust reverser components, single pivot or four bar, rely heavily on riveting together individual details and subassemblies of hardware, such as frames, inner skin, outer skin and other detail parts, A multitude of pieces of hardware and the extensive use of riveting increases the system weight as well as development, tooling and manufacturing costs. These aspects of design are adversely reflected in the aircraft's gross weight, payload, performance and cost of operation. The present invention is based on the lighter construction approach disclosed on the ULTRA REVERSER SYSTEM, including an integral exhaust tailpipe and integral rectangular/trapezoidal clamshell door construction, actuators and control systems. Integral construction of the tailpipe and doors provide a lighter, stronger structural system compared to conventional construction methods which are heavier, and labor intensive. The new system requires less investment in tooling. The incorporation of the side fairings into the rectangular/trapezoidal doors of the new design improves aerodynamic performance by providing blockage for plumes to prevent escaping and impingement on the aircraft fuselage and/or control surfaces, reduces gaps, and contributes to the reduction of external drag characteristics for better fuel consumption and enhances the overall aircraft/engine performance. The new SQUARE ULTRA design, like the ULTRA THRUST REVERSER SYSTEM uses two actuators to deploy the doors or in other configuration where four actuators are used to deploy the doors.

SUMMARY OF THE INVENTION

The invention comprises a rectangular/trapezoidal target doors for a thrust reverser system for jet engines. The rectangular/trapezoidal doors provide a relatively flat surface configuration facing the incoming exhaust gases, which in turn help deflect the exhaust gases forward in a more uniform fashion, thereby reducing the possibility of deflection of exhaust gases laterally thereby resulting in some of the exhaust gases/plumes impinging on the aircraft surfaces.

The side surfaces of the rectangular/trapezoidal doors, act as a strong buffer blocking lateral plumes, thereby minimizing the possibility of impingement on the aircraft surfaces and keeping the majority of the reverse exhaust flow contained by the doors to exert forward decelerating action.

With the rectangular/trapezoidal door shapes, a new actuation system configuration system is used in the SQUARE ULTRA REVERSER SYSTEM where in an alternate configuration each door is driven by two actuators mounted directly between the tailpipe and the doors providing direct motive force to deploy the doors eliminating the driver link mechanism used in the ULTRA THRUST REVERSER SYSTEM. Therefore the SQUARE ULTRA REVERSER SYSTEM can be designed with either actuation/door deployment arrangement.

The reverser system includes a tailpipe, attached clamshell doors and actuators, including linkage, for moving the doors. The actuators and linkage attach between the tailpipe and the doors and move the doors between a stowed position, out of contact with the internal engine gas flow, to a deployed position, diverting internal engine gas flow aft of the tailpipe.

In the preferred embodiments the actuators are housed together with the tailpipe and doors, either on the sides in an internal blister or in the door corners, to form a protrusion free surface for external free air flow over the thrust reverser system area or nacelle similar to the ULTRA THRUST REVERSER SYSTEM.

The actuators may be connected to a pressure booster system to minimize their size. In preferred embodiments the tailpipe comprises a corrugated body. These body corrugations include annularly structured ridges or hats and axially structured depressions or blisters formed with on or in the tailpipe skin. Preferably, the actuators attach to the tail pipe so as to be located in the axial body depressions, and portions of the actuator linkage attach to annular ridge corrugations of the tailpipe body. Acoustical material may be attached over the surface of the tailpipe. In other configuration, four actuators, one at each corner of the door, are used to drive the target doors, thereby eliminating the need for axial body depressions in the tailpipe and eliminating a portion of the actuation linkages.

In preferred embodiments the clamshell doors also have a corrugated body, comprising a smooth outer skin bonded to a corrugated inner skin, In the preferred embodiments the clamshell doors form a pair of semi-rectangular/trapezoidal doors.

One door, in addition, may include a body extension or fairing, in the side direction. Such a door body extension would underlie a portion of the second door in the stowed position. The thrust reverser system may include an aft fairing attached to the tailpipe, a portion of which may be movable from a stowed position out of contact with the flow of the internal engine gas to a deployed position extending rearward of the tailpipe to further guide internal engine gas flow aft of the tailpipe. Preferably, the movable portion of the aft fairing would comprise two sections. Actuators or motors could move these movable portions.

BRIEF DESCRIPTION OF THE DRAWINGS

A better understanding of the present invention can be obtained from the detailed description of exemplary embodiments set forth below, to be considered in conjunction with the attached drawings, in which;

FIGS. 3 and 6 illustrate, by side plan view and cross section, a tailpipe design (with stowed rectangular/trapezoidal doors indicated in dashed line in the former), the design making provision for an acoustic treatment of the tailpipe.

FIG. 4 illustrates by detail drawing an option of covering an interior base of a corrugated hat section of the tailpipe (or the door) with a strip of material.

FIGS. 5, 8 and 9 illustrate an end view of the tailpipe, forward looking aft, indicating the axial depressions that form the internal blisters to house the actuators, as well as details of the actuator forward mounts on both sides of the tailpipe flange, respectively.

FIG. 12 also indicates the corrugating mating door integral hat sections with an integral end kicker plate arrangement as well as integral door frames inner skin.

FIG. 19 illustrates a door inner and outer skin in perspective showing the Square design shape to improve the containment of the exhaust plumes using the straight surfaces forming the sides of the doors, versus the circular door shapes used in the aforementioned patents.

FIG. 20 shows a trapezoidal door configuration while FIG. 21 shows a rectangular door configuration which both fall under the SQUARE ULTRA REVERSER design concept.

FIGS. 22, 23 and 24 illustrate the actuator system, its attachment to the tailpipe and an actuator piston anti-rotation arrangement.

FIG. 31 shows an isometric view and a side view for the rectangular/trapezoidal doors in the deploy position for the configuration where four actuators are directly connected to the doors replacing the driver link and the tailpipe does not have an integral blister.

DETAILED DESCRIPTION OF PREFERRED EMBODIMENT

Figure 1:
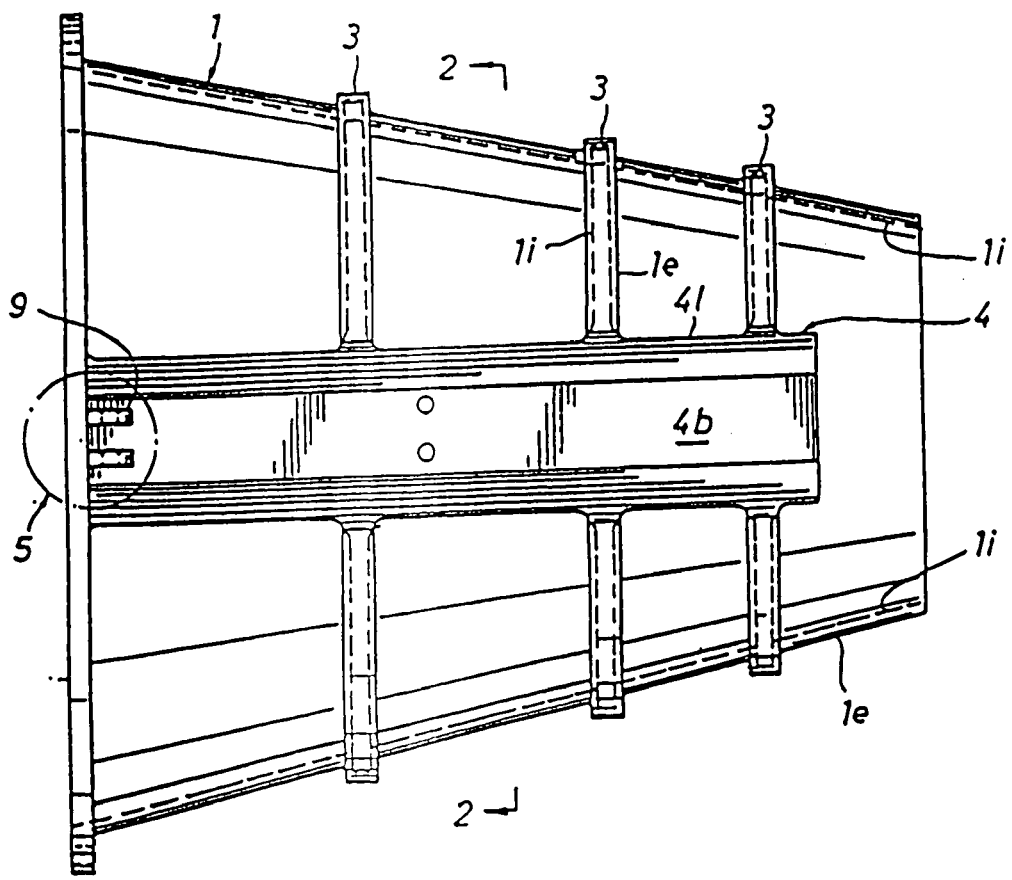
FIGS. 1 and 2 illustrate, by side plan and cross section views, respectively, an integral tailpipe construction, wherein three integral annular corrugated hat or rib sections, for the purpose of discussion, are shown as providing structural integrity, and one axial depression is indicated with attachment points for the actuators.
Figure 2:
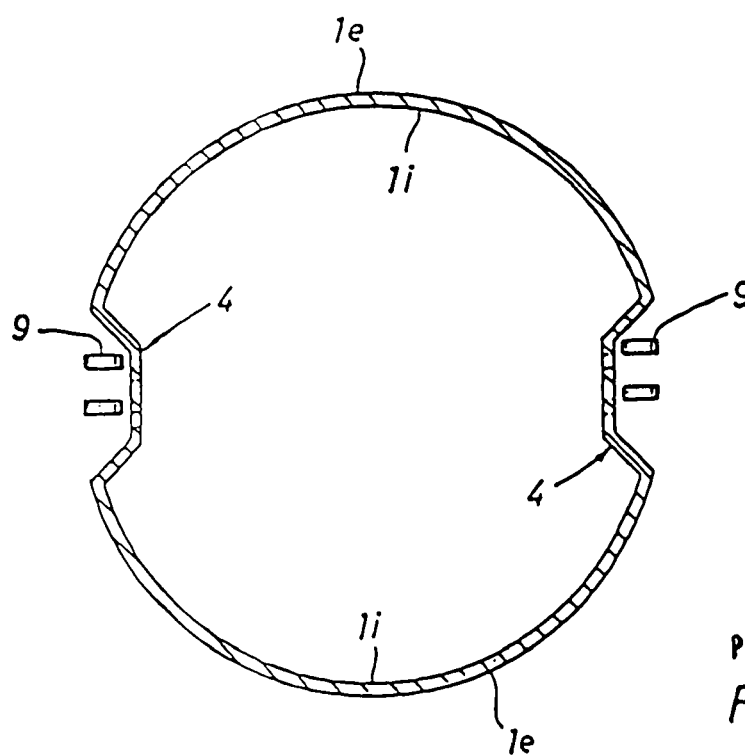

The design concepts included in preferred embodiments of the thrust reverser system include an integrally constructed exhaust tailpipe best illustrated in FIG. 1E. The integrally constructed corrugated exhaust tailpipe 1 acts as the main structure carrying the various thrust reverser system components and loads. The thrust reverser loads (in the reverse mode) are transmitted through the tailpipe 1 to the engine bulkhead (not shown), to be bolted to a tailpipe attachment flange 2.

As illustrated in FIGS. 1–11, the integral corrugation construction of tailpipe 1 includes hats or ridges 3, which comprise annular corrugations sometimes referred to as ribs, which can be pressed into the tailpipe material or attached externally to the tailpipe skin, and internal axial blisters or depressions 4, located on each side of tailpipe 1. This integral corrugated design form a cage structure that permits the tailpipe itself to transmit reverse thrust loads directly, in lieu of requiring separate frames to be riveted to the tailpipe skin. The integral ridges and blisters form a cage-like frame upon the skin of the tailpipe itself. This integral construction technique significantly reduces the manufacturing time and cost and results in a lighter and stronger tailpipe. The hat or rib sections 3 act as the traditional Z or L-sections, by providing twice as much rigidity as traditional Z or L-sections without incurring the weight penalty. If acoustic attenuation is needed, as illustrated in the preferred embodiment in FIG. 3, especially for turbojet or low bypass applications, a similar tailpipe design can be utilized where a bonded honeycomb 5, or whatever sound attenuation material is desired, can be sandwiched between a smooth tailpipe outer skin 6 and an inner corrugated tailpipe perforated skin 7, having an inside surface 1i and an outside surface 1e. Skin 7 maintains the integrally constructed corrugated tailpipe structure of the tailpipe of FIG. 1. Skins 6 and 7 and the sound attenuation material 5 are to be sandwiched and attached together using an appropriate attachment process, depending on the materials used for construction. The hat section areas 3 of skin 7 and the axial depressions 4, would not have any perforations 7A, to enhance structural integrity. Other configurations could be made where the corrugations could be in the outer skin 6 which is attached or fastened to the inner skin 7, enclosing the sound attenuation material between them as before.

Figure 7:
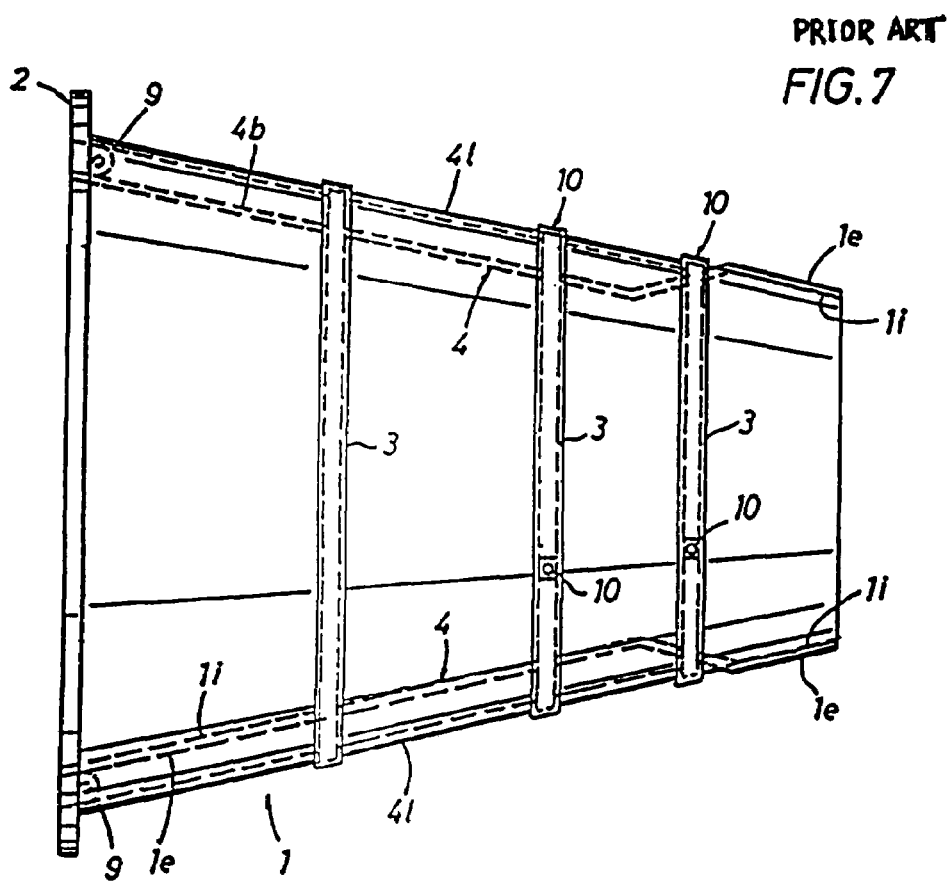
FIGS. 7 and 10 illustrate side plan and detail views, respectively, of a tailpipe including cross section details of an attachment point for connecting a link to the tailpipe.

A strip of material 8, or any other compatible material depending on the material used for construction, could be attached to the inside surface 1i of tailpipe 1, under hat sections 3, in areas exposed to internal flow to enhance internal gas flow characteristics and increase rigidity, if needed. See FIG. 5. The tailpipe surface in the internal gas flow path area will be generally smooth and continuous, except for the base areas of hat sections 3, which are essentially insignificant. Importantly, the contact surface for the internal gas flow through the reverse thrust system is comprised of the unitary tailpipe 1 itself and thus does not allow for any leakage or interruption of the exhaust gas flow, which in turn requires elaborate sealing designs and still results in exhaust flow leakage of several percent with time and stack-up of hardware tolerances. This gas flow leakage from the tailpipe is a major contributor to the deterioration of the overall aircraft/engine system performance, reflected in an increase in fuel consumption and a decrease in range. Tailpipe attachment flange 2, FIG. 1, includes attachment points 9 for the actuators 18. FIG. 7 illustrates in plan view tailpipe 1 wherein the actuator link assembly pivots at point 10 located on the tailpipe integral frame hat section 3. Four link attachment pivot points 10 on the tailpipe are shown. These pivot points connect the doors to the tail pipe frame through links or connecting rods 16.

Figure 31:
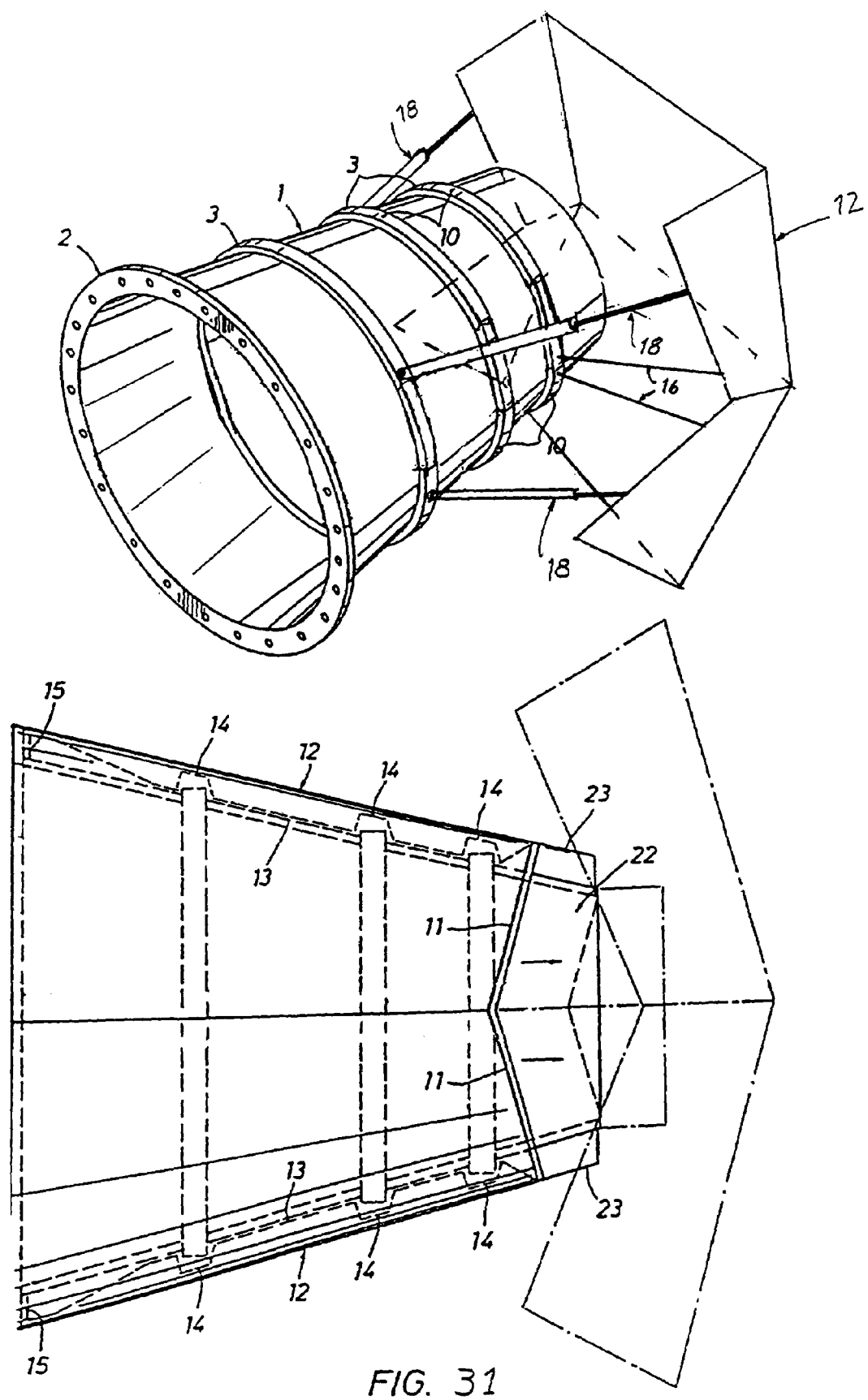
In FIG. 31 the tailpipe does not have an internal blister since the door is deployed using four actuators located at the corners of the doors.

Another arrangement whereby the tailpipe 1 has no axial internal blister where the actuators 18 are attached to the tailpipe as shown in FIG. 31. In this arrangement each one of the actuators 18 substitutes one of the link assemblies 16 and the actuator itself is used to directly deploy/stow the target doors.

Figure 30:
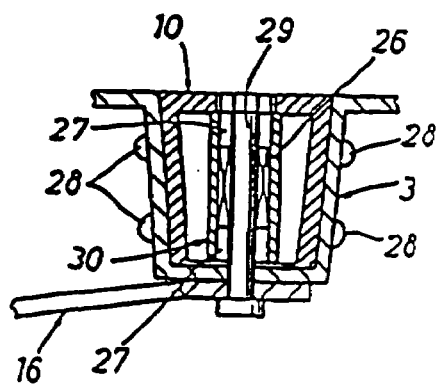
FIG. 30 shows a cross-section of the pivoting point design showing the pivoting axis, the supporting bearing and packing arrangement housed in one of the tailpipe hat sections and attached to a door link.
Figure 10:
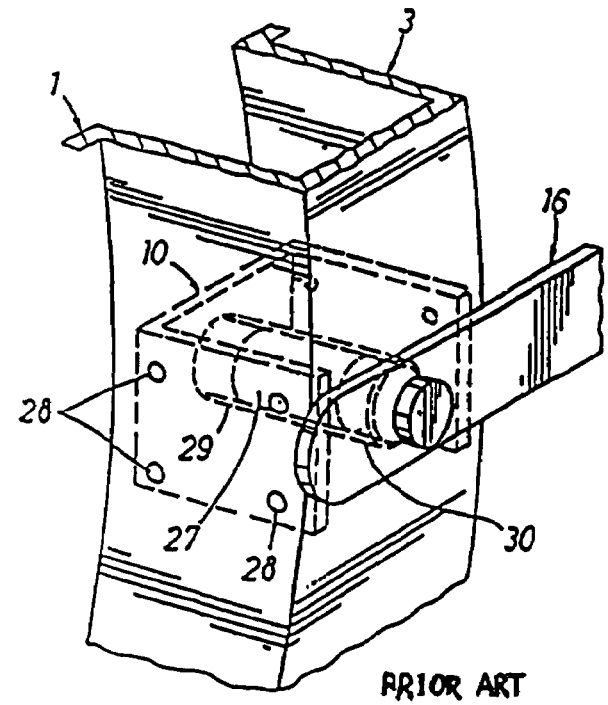
Figure 11:
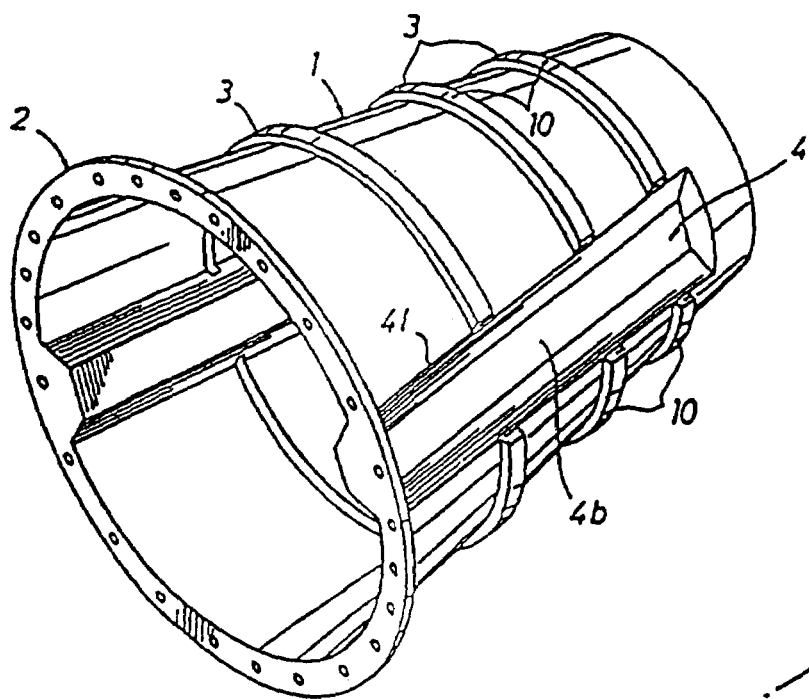
FIG. 11 illustrates in perspective a tailpipe.

Pivot point 10 is more clearly illustrated in detail in FIGS. 30 and 10. Connecting link 16 attaches to pivot 29 having cylindrical housing 30 for bearing 26, and including packing 27. Housing assembly 10 attaches to hat section 3 by attachment means 28.

FIG. 9 shows an end view of tailpipe 1, forward looking aft through the tail pipe. Attachment flange 2 having actuator attachment points 9 is illustrated and more particularly detailed in FIGS. 8 and 5.

Figure 18:
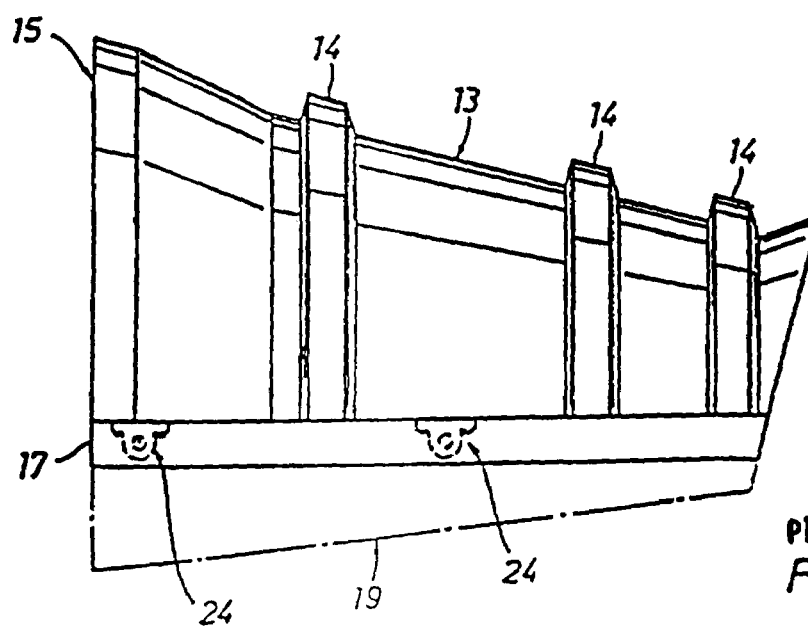
FIG. 18 illustrates in side plan view the inner skin of the door, showing the integral frame sections, the end plate, the attachment fittings and indicating the underlap feature.
Figure 14:
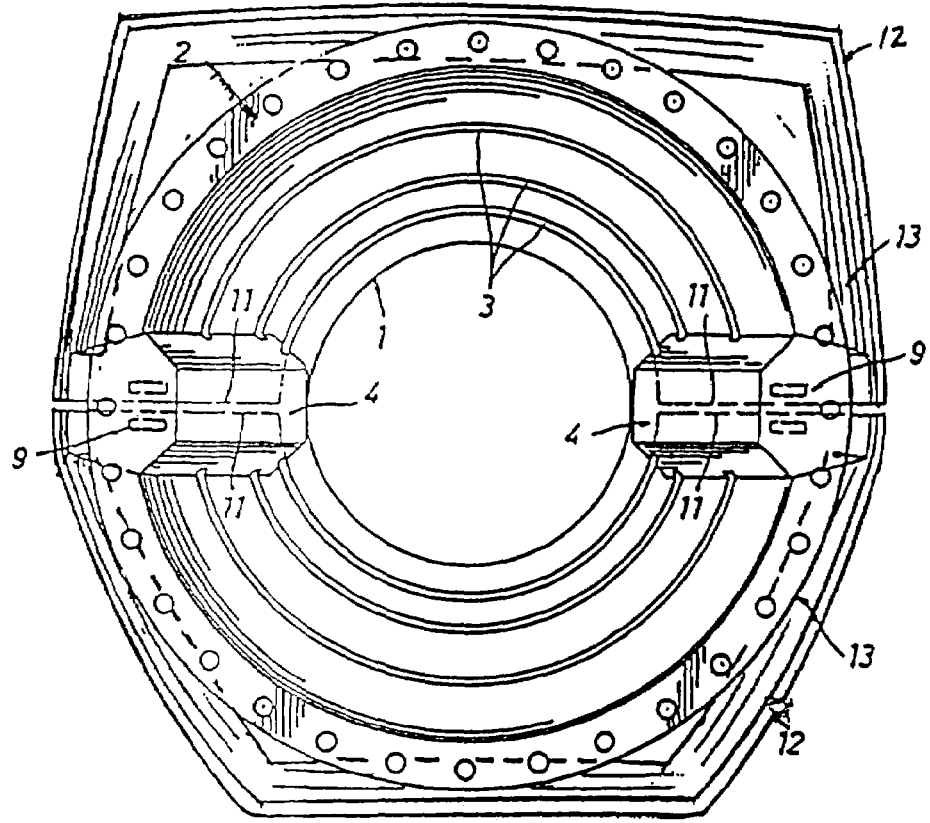
FIG. 14 illustrates an end view of the doors over the tailpipe, forward looking aft into the tailpipe, indicating in particular a cavity formed between the door edges over the tailpipe internal blisters for housing an actuator on each side of the tailpipe. The upper door is rectangular while the lower door is shown as trapezoidal, which is the alternate configuration for the door invention.
Figure 16:
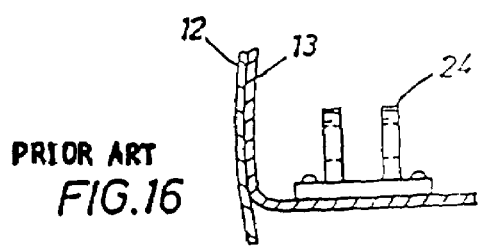
FIGS. 16 and 17 illustrate details of the attachment point.
Figure 17:
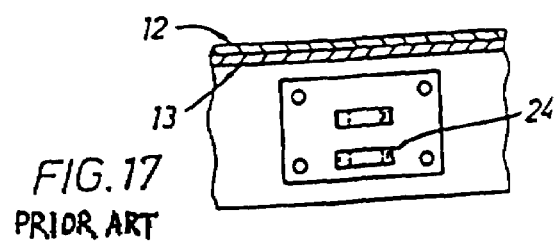
Figure 20:
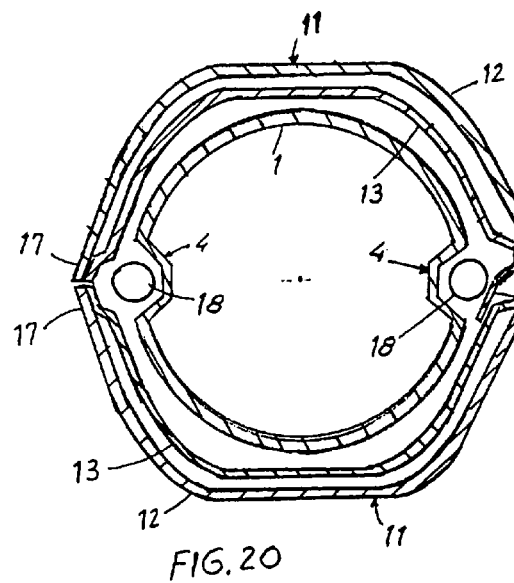
FIGS. 20 and 21 show cross-sections of a door and tailpipe, not at a hat or rib and at a hat or rib, respectively, illustrating the integral fairings arrangement, the underlap extension concept, the actuators position and the internal tailpipe blisters.
Figure 21:
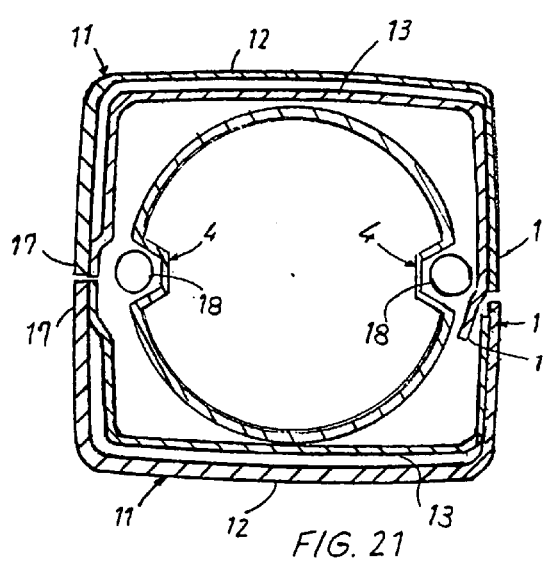
Figure 15:
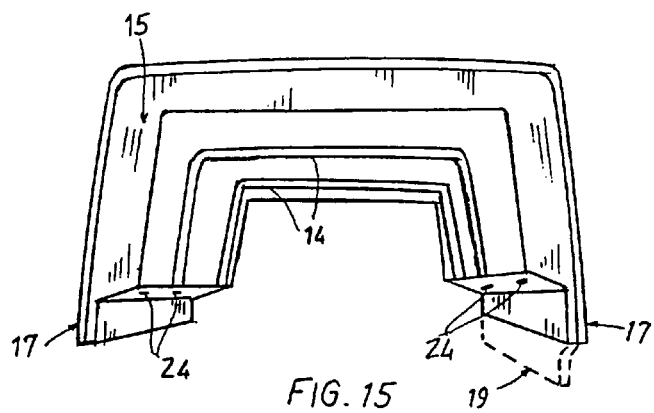
FIG. 15 illustrates in end view a door indicating attachment points for the links and a side fairing combined with the door skin.
Figure 32:
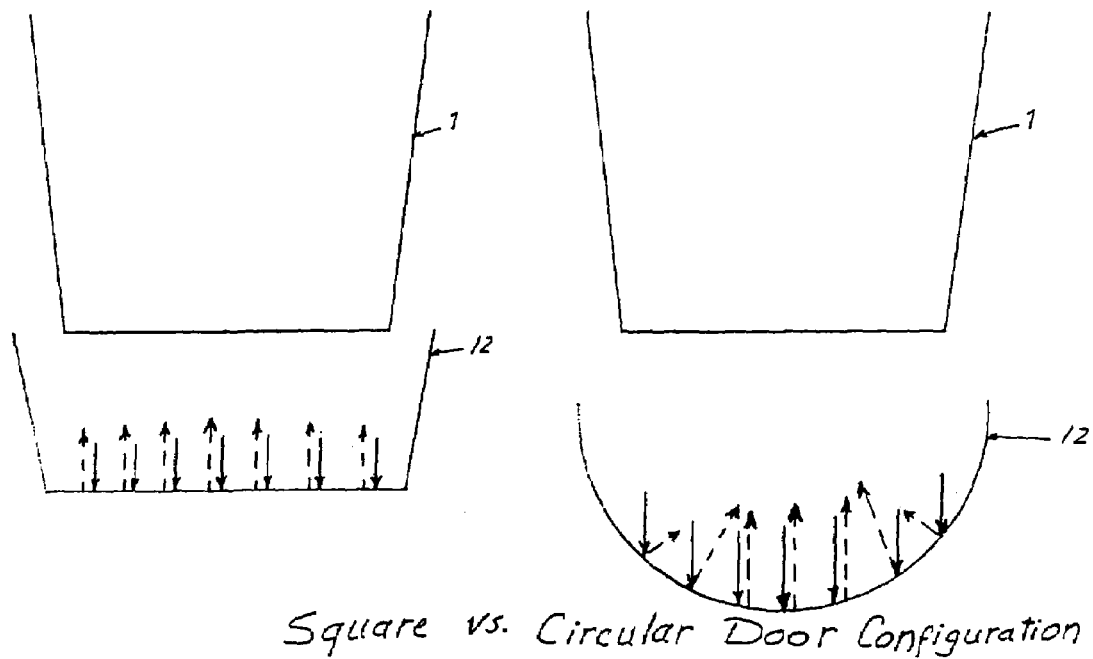
FIG. 32 shows a comparison of the impact of the rectangular/trapezoidal flat surface in allowing the majority of the exhaust gases to rebound in the forward direction, as compared with the circular door shape in which exhaust gases bounce back in different directions thereby reducing reverse thrust efficiency and can be conducive to exhaust plume escape and impingement on aircraft surfaces.

FIGS. 12–19 and FIGS. 20 and 21 illustrate a preferred embodiment for the integral construction of rectangular/trapezoidal clamshell doors 11. The doors consist of rectangular/trapezoidal outer skin 12 and inner skin 13 that can withstand heat. The inner skin 13 preferably has integral frame corrugations 14, comprising two, three or more circular ribs or hats, depending on the loads and the door size. Such design replaces the conventional separate frame construction where structural support usually is riveted between outer and inner skins. The elimination of the conventional frame support results in the elimination of more than half the number of rivets. The present design teaches the direct attachment of the inner skin 13 and the outer skin 12, such as at the trough of the hat sections 14, using appropriate attachment and bonding proces. This reduces weight and manufacturing costs significantly. Again, a strip of material could be attached to the base of the annular channel 14 sections on the interior of the doors, or the hat sections 14 can be attached to the inner skin outer surface using appropriate attachment and bonding process, similar to that disclosed in a preferred design. Inner skin 13 includes a kicker end plate 15, located at the forward end of each door (when stowed), to further divert the reversed flow of gases in the reverse mode. Four connecting rods, or links, 16 connect each door 11 to actuators 18 and tailpipe 1, illustrated in FIG. 26. The links are shown connected to the doors using four fittings 24 bolted to portions of the inner door skin 13, as shown more particularly in FIGS. 16 and 17. Illustrated in FIGS. 15,18 and 19 is the elimination of conventional fairings on the sides of the thrust reverser doors and incorporating those fairings into the integral construction of the doors 11, as done with the circular ULTRA REVERSER SYSTEM. The fact that the doors in the SQUARE ULTRA design have a flat surface for the exhaust flow from the tailpipe to bounce on, this inner skin door configuration helps the majority of the reverse flow to deflect forward in the same general plane as the incoming flow and the same direction of motion of the aircraft, as shown in FIG. 32. The inner skin of circular doors due to the curvature of the surface, causes the reverse flow to bounce in different directions which is conducive to lateral exhaust plumes impinging on the aircraft surfaces and not necessarily contributing to the primary function of reversing the flow to decelerate the aircraft. The two flat sides of the door act as a buffer to minimize exhaust plume escape in the lateral direction and impingement on the aircraft. Current designs use different shapes of fairings to cover the actuators and actuation mechanism on the side of the tailpipe, in addition provide for the protrusion of the fairings into the free air stream. The elimination of separate individual fairings is achieved by extending the upper and lower doors outer and inner skins, referred to in combination as element 17, to form rectangular/trapezoidal doors to cover actuators 18, as shown also in FIGS. 20 and 21. An important further benefit of this idea is providing extensions 17 on the doors as an additional barrier between the reversed internal engine gases and the aircraft surface to control and contain the reverse flow plume and keep it away from aircraft surfaces. This will also help keep the flow attached to the doors for an extended period of time in the deployed position to further guide the flow forward to achieve the desired reverse thrust. This approach eliminates the cost of the fabrication and tooling of the conventional fairings and decreases gaps between doors and fairings significantly, which gaps have the potential to cause aerodynamic losses. The incorporation of the conventional fairings into the door construction also saves the weight and cost of the fairings attachment to the structure.

In the preferred embodiment in FIGS. 15, 18, 19, 20 and 21 is extension 19 of the inboard and/or outboard side of either an upper and/or lower door. Such extension 19 would be used, as systems integration and compatibility demands, to further divert the exhaust plume in reverse away from the aircraft surface to enhance its stability on the ground during reverse thrust operation. The extension 19 is shown designed to underlap the edge of the other door in the stowed position, FIGS. 20 and 21, adjacent the actuators 18 received in the tailpipe 1 blisters 4.

Figure 25:
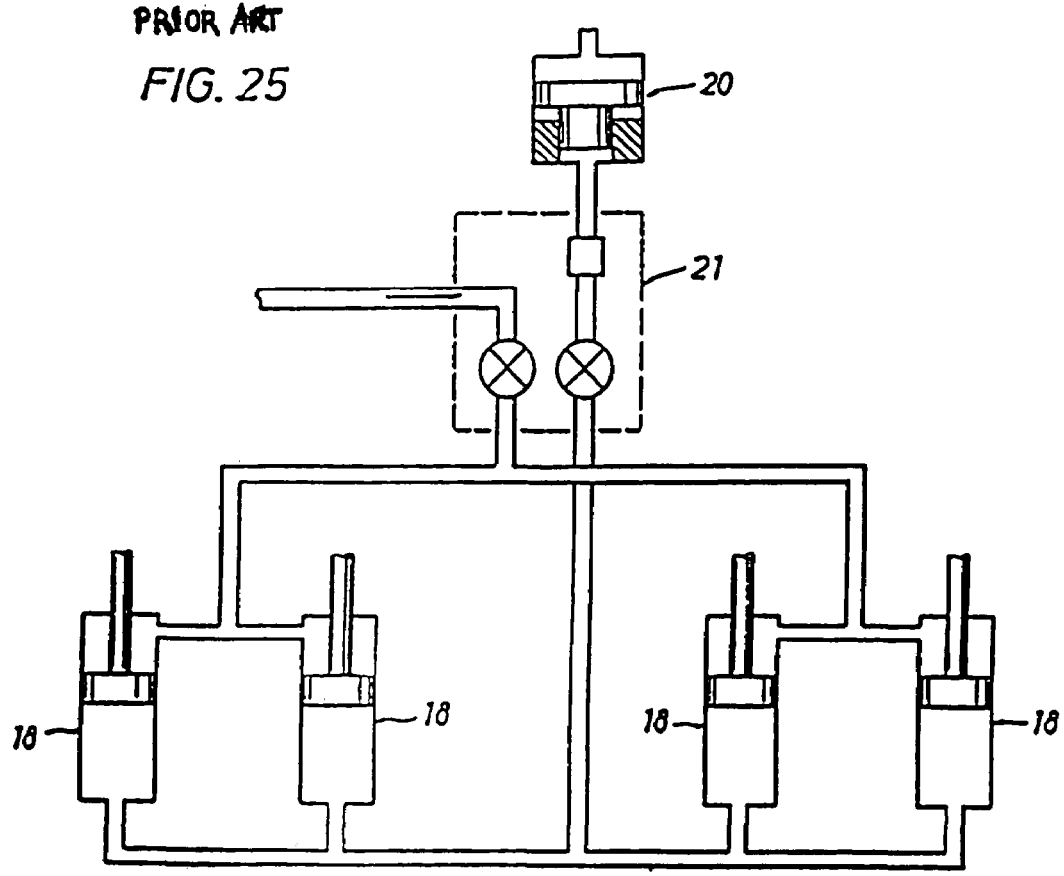
FIG. 25 illustrates a hydraulic system with an intensifier for supplying high pressure hydraulic fluid to the actuators for each thrust reverser, the illustration assumes a two engine configuration, with two actuators per engine for simplicity though other configuration for same patent uses four actuators per engine. Each actuator having two ports, one for deployment and the other for stow operations, and where hydraulic and electric controls for sequence of deployment and restow have been simplified, for discussion purposes, since they are similar to current practices mandated by the airworthiness regulations for safe operation of thrust reverser systems.

As in the ULTRA REVERSER SYSTEM, the SQUARE ULTRA can use a pressure booster 20 for the reverser actuators 18, schematically shown in FIGS. 22 and 25. Customarily hydraulic or pneumatic pressures are used to actuate thrust reverser systems. The idea of boosting pressure could be applied to any type of working fluid. For discussion purposes, the case of hydraulic fluid is used. A hydraulic pressure booster 20 could be installed internally in any section of the aircraft to increase the hydraulic pressure from the aircraft supply, which is usually at 1500–3000 psi. The hydraulic pressure supply to the thrust reverser actuators can be boosted up to 8000 psi or beyond as the technology advances and as sealing technology permits, to meet the most critical reverser need which is usually a restow due to an inadvertent deployment during flight, or as specified by the design or certification requirements. As certification requirements become more stringent and require the ability to restow at increasingly higher speeds, the actuators will tend to become bigger and take more space in the nacelle. This booster approach reduces the necessary size of the hydraulic actuators to be located in the blisters 4 on each side of the tailpipe, which in turn allows each actuator to be housed in a smaller internal tailpipe blister 4 area, thereby minimizing impact on the internal gas flow, or the corner of the door as in the alternate configuration shown in FIG. 31, thereby avoiding protrusion in the free stream. This approach contributes to the optimization of the overall aerodynamic performance of the thrust reverser system due to the significant reduction of various types of drag (friction, base drag, interference drag). Another benefit of using a hydraulic pressure booster is the ability to maintain commonality of actuator sizes, regardless of the aircraft hydraulic pressure supply, while compensating for the aircraft hydraulic pressure supply in the booster design. This system allows using the same reverser and actuators for several aircraft applications in which each aircraft may have a different hydraulic pressure supply rating, hence allowing the same design to lend itself to multiple applications. The booster will be sized to meet the specific restow requirements which are primarily a function of the doors area and loads.

Figure 12:
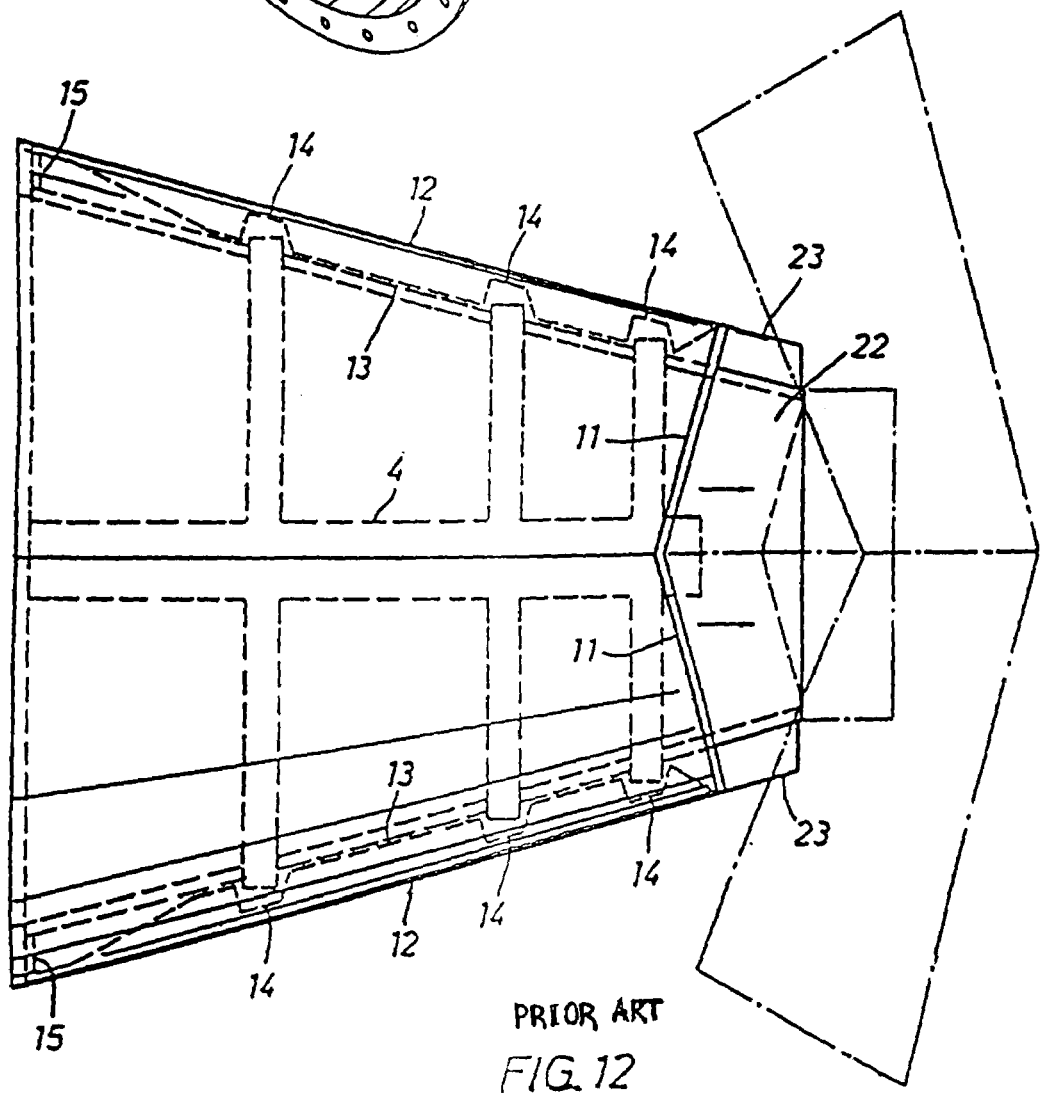
FIG. 12 illustrates a side plan view of the upper and lower doors over the tailpipe, which doors constitute the outer surface of the nacelle surface in the stowed position, with the deployed position indicated in dashed lines, and including aft fairing for the tailpipe.
Figure 13:
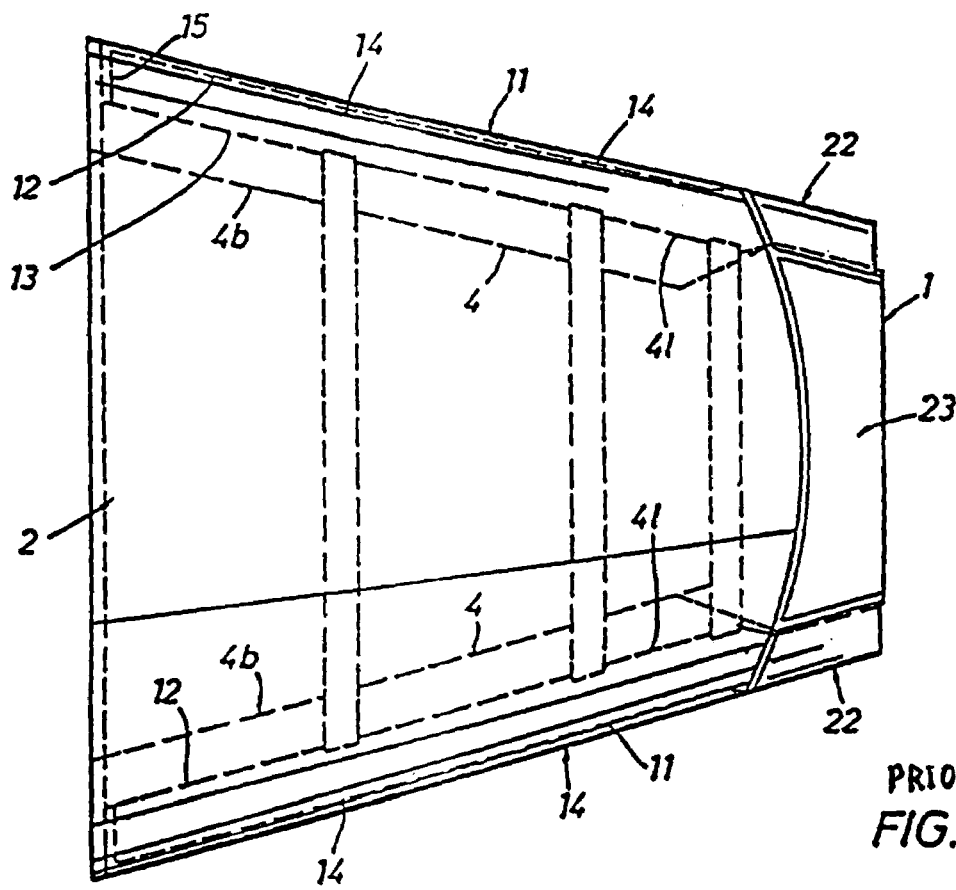
FIG. 13 illustrates in plan view the doors overlying the tailpipe and fixed and moveable aft firings, with an indication of the internal blisters that house the actuators.
Figure 26:
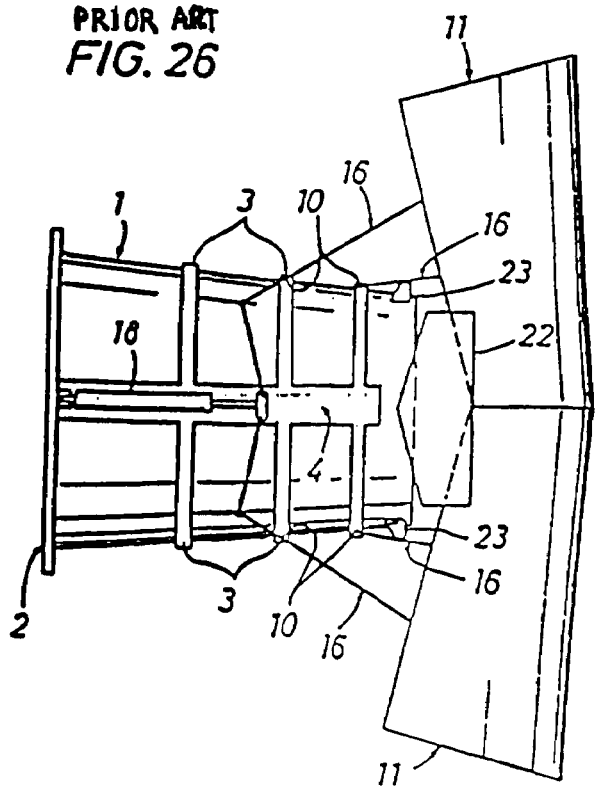
FIGS. 26 and 27 illustrate the reverser system in deployment position with the general arrangement of the actuator, the connecting links, the fixed and movable fairings and the tailpipe, a side view and an end view, forward looking aft.
Figure 27:
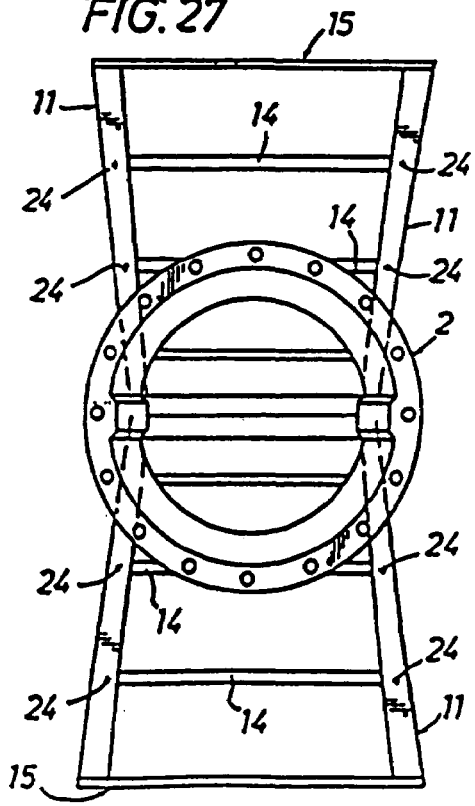
Figure 28:
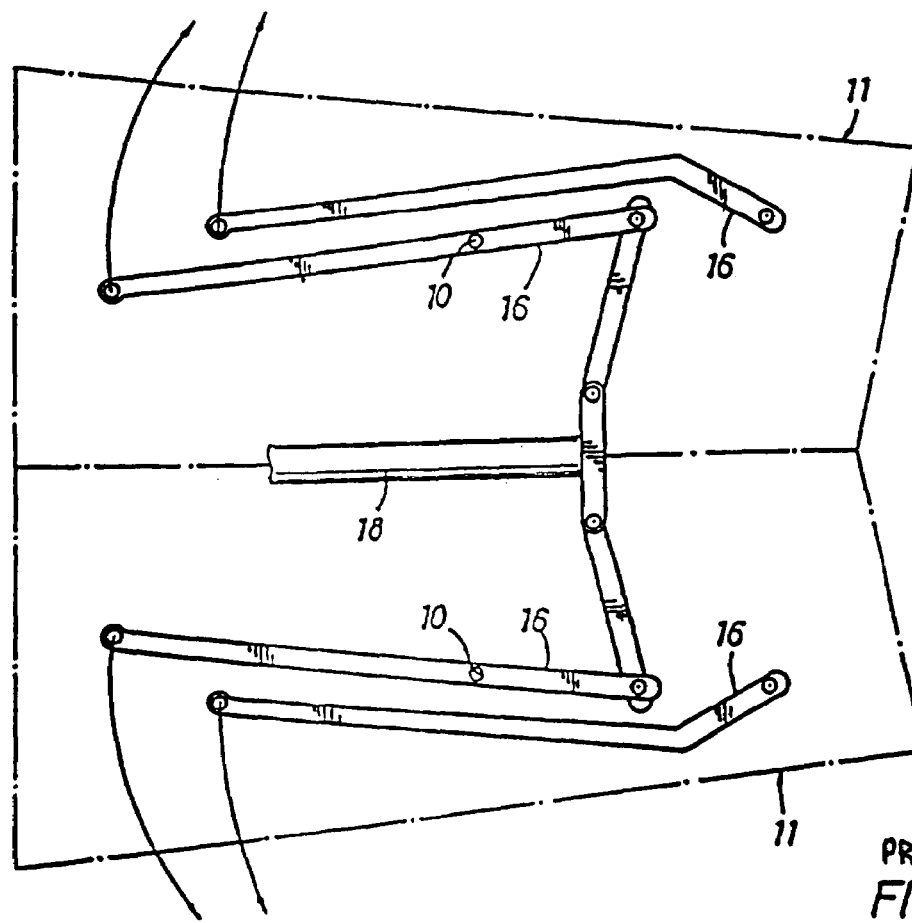
FIG. 28 shows the general arrangement of the actuation system, links and hydraulic actuator with the doors represented in dashed lines. The arrows show the direction of rotation and translation of the doors. Stow is in reverse direction.
Figure 29:
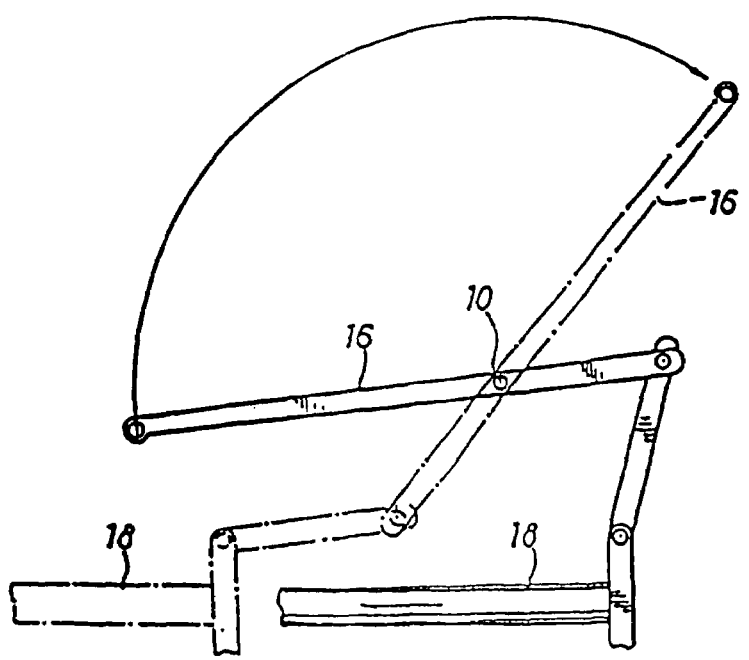
FIG. 29 shows the motion of the driver link, which is connected to the actuator, to the deploy position. Stow is in reverse direction.

The SQUARE ULTRA design utilizes the same idea of the ULTRA REVERSER SYSTEM, illustrated in FIGS. 12 and 26, which is the sliding rearward of a portion 22 of an aft fairing attached to a tailpipe 1, preferably movable portion located on each side of the tailpipe. The driving force may either be through mechanical linkages, or actuated electrically, pneumatically or hydraulically during a deployment cycle. The reminder immobile portion 23 of the aft fairing would be attached to the tailpipe to maintain the external contour line during forward flight mode. Movable at failings, 22 as a tail pipe extension, may be spring loaded to keep them retracted during forward flight mode. Movable aft fairings, 22 as a tail pipe extension, may be be spring loaded to keep them reacted during forward thrust and to maintain the external contour lines. The movable aft fairings 22 would move rearward, when needed, to close the small gap between the tailpipe exit plume and the clamshell doors in the deployed, reverse thrust position. This feature keeps the reverse flow enclosed between the deployed doors and the tailpipe to direct the reverse flow along the door's inner walls and forward to achieve the desired reverse thrust and deceleration. The fairings 22 would be in contact with the relatively cooler and higher pressure by-pass flow; therefore, they could be made out of aluminum, for example.

A pocket extremely high turbulence flow is generated in the vicinity where both doors meet at the end of the deployment stroke for target type reversers. The turbulence is the result of the interaction between the hot gases flowing from the tailpipe rearward and the reverse flow gases rebounding from the inner doors surface. Another benefit of a movable aft fairing portion 22 is using it for alleviation and control of the effect of this highly turbulent flow by controlling the gap between the sliding aft fairing and the doors. It could be set, during flow test, to allow some of the highly turbulent gases to escape to improve the flow characteristics of the rest of the gases along the doors to provide the reverse flow action. The released gases are insignificant, but could have a favorable impact on reverse thrust performance and efficiency. Reverse thrust efficiency translates into less power from the engine during reverse thrust mode, which can lead to a reduction in the engines' cycle count, extension of the time between the engine overhauls and extension of engine components service life due to reduction in accrued operating cycles. The gases would not be allowed to impinge on any of the aircraft control surfaces or critical areas.

In operation, the reverse thrust action aims at slowing down the aircraft after landing or is used for backing up and braking action during taxiing operations. When reverse thrust is commanded, the clamshell doors 11 will be pushed rearward by the actuators, or through a connecting linking mechanism, to a position aft of the exhaust tailpipe exit area to divert the exhaust flow of the engine forward to slow down the aircraft from its landing speed, down to a manageable taxiing speed.

In the preferred design, the force resulting from the exhaust flow impingement on the doors will be absorbed by either the links or the actuators, which in turn transfer the loads onto the tailpipe integral frames, ski and blister structure, which transfer the load to the engine or nacelle bulkhead through a bolted flange.

Boosted hydraulic pressure supply to the thrust reverser actuators would result in the reduction of their respective diameters, thereby minimizing the impact of the tailpipe internal blister housing the actuator system on the internal engine exhaust gas flow path. Even with conventional designs, smaller actuators would help eliminate the need for external blisters protruding in the free air stream. Fairing protrusion in the free air stream to cover the actuation system results in external drag increase leading to a several percent increase in SFC during normal cruise.

The elimination of the separate side fairings achieved by extending the doors to cover the actuation system, as used in the ULTRA THRUST REVERSER DESIGN, also helps effectively enclose the jet flow within the door during reverse mode and prevent it from escaping towards aircraft control surfaces, due to having straight side surfaces for the door instead of circular one as used in other designs. The elimination of the separate side fairings also helps eliminate any need to have external provisions in the free stream to divert any escaped plume away from the aircraft control surfaces.

The foregoing disclosure and description of the invention are illustrative and explanatory thereof, and various changes in the size, shape, and materials, as well as in the detail of the illustrated system may be made without departing from the spirit of the invention.

What is claimed is:

1. A thrust reverser system for a jet engine, comprising:
    a tailpipe having an internal surface in contact with engine internal gas flow, and an outer surface;
    a pair of clamshell-type doors, each door comprising a substantially flat center panel, an inboard first side panel extending from an inboard first longitudinal edge of the center panel, and an outboard second side panel extending from an outboard second longitudinal edge of the center panel;
    said doors moveable between a stowed position, overlaying the tailpipe and out of contact with internal gas flow, and a deployed position, behind the tailpipe, wherein a majority of the internal gas flow impinges directly upon the door center panels.

2. The thrust reverser system of claim 1, wherein the doors contact each other along longitudinal free edges of the side panels when in stowed position, thereby fully surrounding the tailpipe.

3. The thrust reverser system of claim 2, wherein the inboard and outboard side panels are substantially flat.

4. The thrust reverser system of claim 3, wherein the side panels extend at right angles from the center panel, such that both doors together in stowed position define a substantially rectangular cross-section.

5. The thrust reverser system of claim 3, wherein the angle between the side panels and the center panels is substantially greater than a right angle, such that both doors together in stowed position define a hexagonal cross-section.

6. The thrust reverser system of claim 1, further comprising a system of actuators and linkages attached between the tailpipe outer surface and the doors.

7. The thrust reverser system of claim 6, wherein the system of actuators and linkages comprise for each door at least one hydraulic actuator directly linking the tailpipe outer surface to the door.

8. The thrust reverser system of claim 7, wherein the at least one hydraulic actuator is positioned within a cavity between the door and the tailpipe outer surface when the door is in stowed position.

9. The thrust reverser system of claim 7, wherein the at least one hydraulic actuator is positioned within a depression in the outer surface of the tailpipe.

10. The thrust reverser system of claim 6, wherein the system of actuators and linkages comprises, for each door, a pair of pivotally mounted hydraulic actuators directly linking the tailpipe outer surface to the door, and a pair of pivotally mounted rods directly linking the tailpipe outer surface to the door.

11. The thrust reverser system of claim 6, wherein the system of actuators and linkages comprises, for each door, two pair of pivotally mounted hydraulic actuators directly linking the tailpipe outer surface to the door.

12. A thrust reverser system for a jet engine, comprising:
    a tailpipe having an internal surface in contact with engine internal gas flow, and an outer surface;
    a pair of reverser doors, each door comprising forward and aft ends, and a substantially flat center panel;
    said doors moveable between a stowed position, overlaying the tailpipe, and out of contact with internal gas flow, and a deployed position, disposed behind the tailpipe in abutting relation along their aft ends, and wherein a majority of the internal gas flow impinges directly upon the flat center panels.

13. The thrust reverser system of claim 12, wherein the reverser doors further comprise first inboard and second outboard side panels extending from opposed longitudinal edges of the certain panels.

14. The thrust reverser system of claim 13, wherein the side panels are at substantially right angles to the center panels.

15. The thrust reverser system of claim 13, wherein, in deployed position, the flat center panels are positioned substantially perpendicular to the impinging internal gas flow.

16. The thrust reverser system of claim 12, further comprising a first pair of hydraulic actuators directly linking each door to the tailpipe outer surface, and configured to move the doors between the stowed and deployed positions.

17. The thrust reverser system of claim 16, further comprising a second pair of hydraulic atuators directly linking each door to the tailpipe outer surface, and configured to move the doors between the stowed and deployed positions.

18. A thrust reverser system for a jet engine, comprising:
a tailpipe having an internal surface in contact with engine internal gas flow, and an outer surface;
a pair of reverser doors, each door comprising forward and aft ends, and a substantially flat center portion;
at least one hydraulic actuator directly linking each reverser door to the tailpipe outer surface;
said doors moveable between a stowed position, overlaying the tailpipe, and out of contact with internal gas flow, and a deployed position, disposed behind the tailpipe in abutting relation along their aft ends, and wherein said flat center portion deflects the internal gas flow.

19. The thrust reverser system of claim 18, wherein said at least one hydraulic actuator comprises a first pair of hydraulic actuators.

20. The thrust reverser system of claim 19, further comprising a second pair of hydraulic actuators directly linking each reverser door to the tailpipe outer surface.

21. The thrust reverser system of claim 18, wherein the reverser doors further comprise substantially flat first inboard and second outboard side panels.

22. The thrust reverser system of claim 18, wherein the first inboard and second outboard side panels extend at a right angle from the door center portions.

23. The thrust reverser system of claim 22, wherein the reverser doors fully surround the tailpipe when in stowed position.

* * * * *